US012212922B2

(12) United States Patent
Pulice

(10) Patent No.: US 12,212,922 B2
(45) Date of Patent: Jan. 28, 2025

(54) NOISE-REDUCING LOUDSPEAKER

(71) Applicant: HARMAN INTERNATIONAL INDUSTRIES, INCORPORATED, Stamford, CT (US)

(72) Inventor: Eugene Pulice, Ann Arbor, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 247 days.

(21) Appl. No.: 17/583,801

(22) Filed: Jan. 25, 2022

(65) Prior Publication Data

US 2023/0247347 A1 Aug. 3, 2023

(51) Int. Cl.
*H04R 7/06* (2006.01)
*H04R 1/28* (2006.01)
*H04R 7/02* (2006.01)

(52) U.S. Cl.
CPC ............. *H04R 1/2873* (2013.01); *H04R 7/02* (2013.01)

(58) Field of Classification Search
CPC .......... H04R 7/12; H04R 7/122; H04R 7/125; H04R 7/127; H04R 2307/029; H04R 2499/13
See application file for complete search history.

(56) References Cited

U.S. PATENT DOCUMENTS 2,302,178 A * 11/1942 Brennan .................. H04R 7/20 181/172
4,140,203 A * 2/1979 Niguchi ................. G10K 13/00 181/170
6,944,311 B2 * 9/2005 Nishikawa ............. H04R 1/025 381/124
7,510,048 B2 * 3/2009 Nevill ...................... H04R 7/14 181/174
7,726,441 B2 * 6/2010 Uryu ........................ H04R 7/10 181/170
9,369,805 B2 * 6/2016 Wilson ..................... H04R 7/26
9,827,749 B2 * 11/2017 Egger .................. C09D 171/00
10,235,985 B2 3/2019 Christoph et al.
2005/0041829 A1 * 2/2005 Abe ..................... H04R 1/2896 381/396
2005/0051380 A1 3/2005 Takayama et al.
2006/0222202 A1 10/2006 Uryu et al.
2010/0046773 A1 * 2/2010 Windischberger ....... H04R 7/10 381/164
2015/0319532 A1 11/2015 Jin et al.
(Continued)

FOREIGN PATENT DOCUMENTS

CN 109982211 A * 7/2019
CN 112565983 A * 3/2021
(Continued)

*Primary Examiner* — Ryan Robinson
(74) *Attorney, Agent, or Firm* — Artegis Law Group, LLP

(57) ABSTRACT

Embodiments of the present disclosure set forth a noise-reducing loudspeaker and systems implementing such. In one aspect, a loudspeaker apparatus comprises a diaphragm. The diaphragm comprises an acoustic layer configured to emit output sounds toward a first side of the loudspeaker apparatus; and a first sound attenuation layer configured to attenuate sounds passing from a second side of the loudspeaker apparatus to the first side through the diaphragm, where the first sound attenuation layer is positioned nearer to the second side relative to the acoustic layer.

20 Claims, 6 Drawing Sheets

(56) References Cited

U.S. PATENT DOCUMENTS

| | | | | |
|---|---|---|---|---|
| 2017/0195797 | A1* | 7/2017 | Lazzari | H04R 9/025 |
| 2019/0098423 | A1* | 3/2019 | Zechner | H04R 1/288 |
| 2022/0210543 | A1* | 6/2022 | Corynen | H04R 1/028 |

FOREIGN PATENT DOCUMENTS

| | | | | |
|---|---|---|---|---|
| DE | 102011084168 | A1 * | 4/2013 | H04R 31/003 |
| WO | WO-2009118940 | A1 * | 10/2009 | H04R 31/003 |
| WO | WO-2021000118 | A1 * | 1/2021 | |

* cited by examiner

NOISE-REDUCING LOUDSPEAKER

BACKGROUND

Field of the Various Embodiments

The various embodiments relate generally to audio loudspeakers, and more specifically, to a noise-reducing loudspeaker.

Description of the Related Art

Automotive audio systems typically include multiple loudspeakers. The loudspeakers can include loudspeakers of various types, including for example full range drivers, subwoofers, etc. The loudspeakers can be positioned in various locations within a passenger compartment of a vehicle. Typical loudspeaker positions include the dashboard, door panels, interior trim panels, headrests, and/or the like. The audio system, including the placement and/or construction of the loudspeakers, can be designed to deliver an enjoyable auditory experience within the passenger compartment.

In an automotive audio system, a loudspeaker can couple the passenger compartment to the outside environment. That is, the loudspeaker vents or is ported to the environment outside of the vehicle, thereby utilizing the outside environment as a baffle. Such an externally coupled loudspeaker can be located in the trunk, the rear panel shelf, the chassis or a frame of a vehicle. In this way, an otherwise necessary loudspeaker housing may be omitted because the front and the back sides of this externally coupled loudspeaker are isolated from each other by the rear panel shelf or the chassis, respectively. This approach, therefore, allows for a very compact and weight efficient arrangement without sacrificing acoustical performance. A drawback of this omission of a housing, however, is that noise which would normally be blocked by the otherwise sealed passenger cabin may enter the vehicle which leads to a higher amount of exterior noise entering into the vehicle cabin.

A solution to this drawback of higher noise is to place a noise-vibration-harshness (NVH) or other sound-attenuating material in front of the face of the externally coupled loudspeaker that is facing the passenger compartment within the vehicle. A drawback of this solution is that the NVH material in front of the face of the externally coupled loudspeaker can significantly decrease the acoustic output of the externally coupled loudspeaker directed into the passenger compartment. The deceased acoustic output can lead to decreased enjoyment of and satisfaction with the audio produced by the externally coupled loudspeaker.

Accordingly, more effective ways to reduce the noise that passes from one side of an externally coupled loudspeaker to the other are needed.

SUMMARY

One embodiment sets forth a loudspeaker apparatus comprising a diaphragm. The diaphragm comprises an acoustic layer configured to emit output sounds toward a first side of the loudspeaker apparatus; and a first sound attenuation layer configured to attenuate sounds passing from a second side of the loudspeaker apparatus to the first side through the diaphragm, where the first sound attenuation layer is positioned nearer to the second side relative to the acoustic layer.

One embodiment sets forth an audio system comprising a loudspeaker. The loudspeaker comprises a diaphragm and a dust cap. The diaphragm comprises an acoustic layer configured to emit output sounds toward a first side of the loudspeaker; and a first sound attenuation layer configured to attenuate sounds passing from a second side of the loudspeaker to the first side, where the first sound attenuation layer is positioned nearer to the second side relative to the acoustic layer.

One embodiment sets forth a loudspeaker apparatus comprising a diaphragm. The diaphragm comprises a single layer of material, where the single layer is configured to emit output sounds toward a first side of the loudspeaker apparatus, provide structure to the diaphragm, and attenuate sounds passing from a second side of the loudspeaker apparatus to the first side.

Further embodiments provide, among other things, apparatuses and systems configured to implement the above embodiments.

At least one technical advantage of the disclosed techniques relative to the prior art is that, with the disclosed techniques, undesirable noise passing through an externally coupled loudspeaker from an outside environment can be attenuated with less impact on the acoustic output of the loudspeaker. Accordingly, the loudspeaker can produce higher-output audio while the undesirable noise is mitigated, compared to conventional approaches. Another technical advantage is that the passing noise can be attenuated by the loudspeaker without adding an additional piece of material in front of the loudspeaker. Accordingly, the loudspeaker takes up less space. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1A:
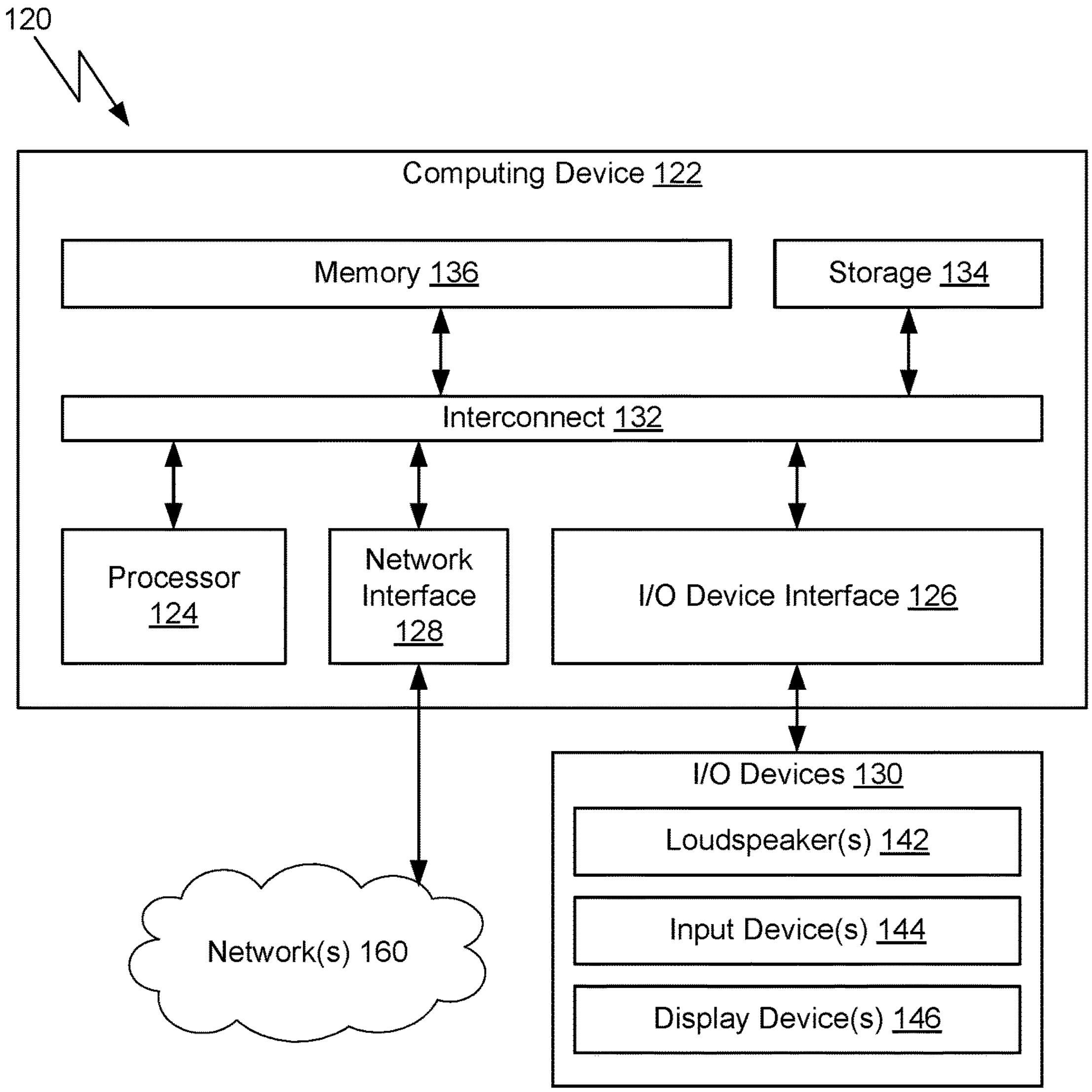
FIG. 1A is a block diagram illustrating an audio system, according to various embodiments.

FIG. 1A illustrates an audio system 120 configured to implement one or more aspects of the various embodiments. In various embodiments, audio system 120 can be implemented in a vehicle (e.g., car, truck, boat, watercraft, airplane, etc.).

As shown, audio system 120 includes, without limitation, computing device 122, input/output (I/O) device(s) 130, and optionally network(s) 160. Computing device 122 includes, without limitation, a processor 124, I/O device interface 126, network interface 128, interconnect 132 (e.g., a bus), storage 134, and memory 136. Processor 124 and memory 136 can be implemented in any technically feasible fashion. For example, and without limitation, in various embodiments, any combination of processor 124 and memory 136 can be implemented as a stand-alone chip or as part of a more comprehensive solution that is implemented as an application-specific integrated circuit (ASIC), a system-on-a-chip (SoC), and/or the like. Processor 124, I/O device interface 126, network interface 128, storage 134, and memory 136 can be communicatively coupled to each other via interconnect 132.

The one or more processors 124 can include any suitable processor, such as a central processing unit (CPU), a graphics processing unit (GPU), an application-specific integrated circuit (ASIC), a field programmable gate array (FPGA), a tensor processing unit (TPU), any other type of processing unit, or a combination of multiple processing units, such as a CPU configured to operate in conjunction with a GPU. In general, each of the one or more processors 124 can be any technically feasible hardware unit capable of processing data and/or executing software applications and modules, including playing back media content.

Storage 134 can include non-volatile storage for applications, software modules, and data, and can include fixed or removable disk drives, flash memory devices, and CD-ROM, DVD-ROM, Blu-Ray, HD-DVD, or other magnetic, optical, solid state storage devices, and/or the like.

Memory 136 can include a random access memory (RAM) module, a flash memory unit, or any other type of memory unit or combination thereof. The one or more processors 124, I/O device interface 126, and network interface 128 are configured to read data from and write data to memory 136. Memory 136 includes various software programs and modules (e.g., an operating system, one or more applications, a media player application) that can be executed by processor 124 and application data (e.g., data loaded from storage 134) associated with said software programs. In some embodiments, in operation, a media player application in memory 136 can process media content that includes audio (e.g., playback a music CD, decode an audio MP3 file) and output the audio to loudspeakers 142, which can generate sound waves corresponding to the audio content.

In some embodiments, computing device 122 is communicatively coupled to one or more networks 160. Network(s) 160 can be any technically feasible type of communications network that allows data to be exchanged between computing device 122 and remote systems or devices (not shown), such as a server, a cloud computing system, or other networked computing device or system. For example, network(s) 160 can include a wide area network (WAN), a local area network (LAN), a wireless network (e.g., a Wi-Fi network, a cellular data network), and/or the Internet, among others. Computing device 122 can connect with network(s) 160 via network interface 128. In some embodiments, network interface 128 is hardware, software, or a combination of hardware and software, that is configured to connect to and interface with network(s) 160.

In some embodiments, computing device 122 is communicatively coupled to a local device separate from computing device 122. For example, computing device 122 could be paired with another device (e.g., smartphone, tablet computer, notebook or desktop computer) located in proximity to computing device 122. Computing device 122 can be coupled to that other device via network interface 128 (e.g., via network(s) 160) or via I/O device interface 126 by wire or wirelessly in any technically feasible manner (e.g., Universal Serial Bus (USB), Bluetooth, ad-hoc Wi-Fi).

I/O devices 130 can include devices capable of providing input, as well as devices capable of providing output. For example, in various embodiments, I/O devices 130 include one or more loudspeakers 142, one or more input devices 144, and one or more display devices 146. Examples of input devices 144 include, without limitation, a touch-sensitive surface (e.g., a touchpad), a touch-sensitive screen, buttons, knobs, dials, joysticks, and/or the like. Additional examples of input devices 144 include a microphone and an imaging device. Examples of display devices 146 include, without limitation, LCD displays, LED displays, touch-sensitive displays, transparent displays, and/or the like. Additionally, I/O devices 130 can include devices capable of both receiving input and providing output, such as a touch-sensitive display, and/or the like.

Loudspeaker(s) 142 include one or more loudspeakers capable of outputting audio in the form of sound waves. Types of loudspeaker(s) 142 can include, without limitation, full range drivers, mid-range drivers, woofers, subwoofers, tweeters, and/or the like. In some embodiments, loudspeakers 142 includes one or more externally coupled loudspeakers.

In some embodiments, audio system 120 is implemented in a vehicle. Computing device 122 can be a head unit of the vehicle, and loudspeakers 142 can be installed (e.g., mounted) at various positions in the vehicle (e.g., within the passenger compartment, within the vehicle cabin).

Figure 1B:
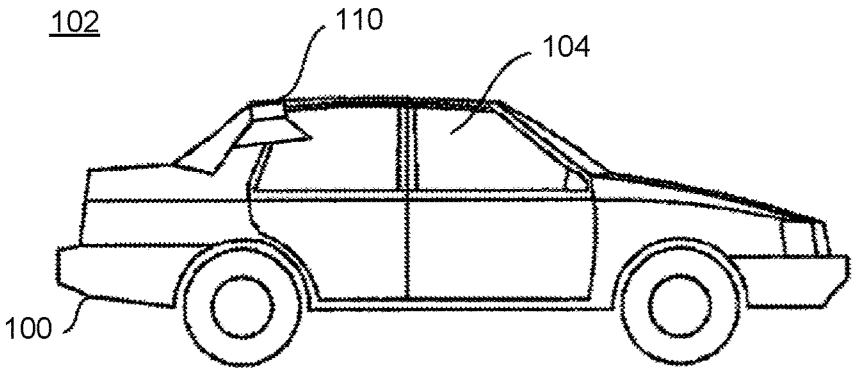
FIG. 1B is a schematic diagram illustrating an example vehicle with an externally coupled loudspeaker, according to various embodiments.

FIG. 1B illustrates an example vehicle 100 with a loudspeaker 110, according to various embodiments. Loudspeaker 110 can be included in loudspeakers 142 of an automotive audio system implemented in vehicle 100 (e.g., audio system 120 implemented in vehicle 100). While one loudspeaker 110 is exemplarily illustrated in FIG. 1, automotive audio systems can include multiple loudspeakers. A loudspeaker 110 can be positioned in different locations within and/or along a vehicle cabin 104 (e.g., a passenger cabin or compartment) of vehicle 100. If a loudspeaker 110 is positioned in the chassis of vehicle 100 between vehicle cabin 104 and an outside environment 102 external to vehicle 100 (e.g., mounted directly on the chassis of vehicle 100 and vents to outside environment 102), then the chassis of vehicle can serve to isolate the front side of loudspeaker 110 from the back side of loudspeaker 110, obviating the need for a separate housing or enclosure for loudspeaker 110. Accordingly, a loudspeaker housing can be omitted for loudspeaker 110. Such a loudspeaker, where one side vents to the outside environment, can be referred to as an "externally coupled [loud]speaker" (hereinafter abbreviated as "ECS"); the ECS is coupled to both vehicle cabin 104 and outside environment 102. In some embodiments, the ECS can be a full-range driver, a subwoofer, a woofer, a mid-range driver, a tweeter, a coaxial driver, or any other type of loudspeaker. In a specific example, vehicle 100 is a pickup truck, and an ECS (e.g., a subwoofer) can be mounted between the back row seats and the rear panel of the passenger cabin.

Figure 2:
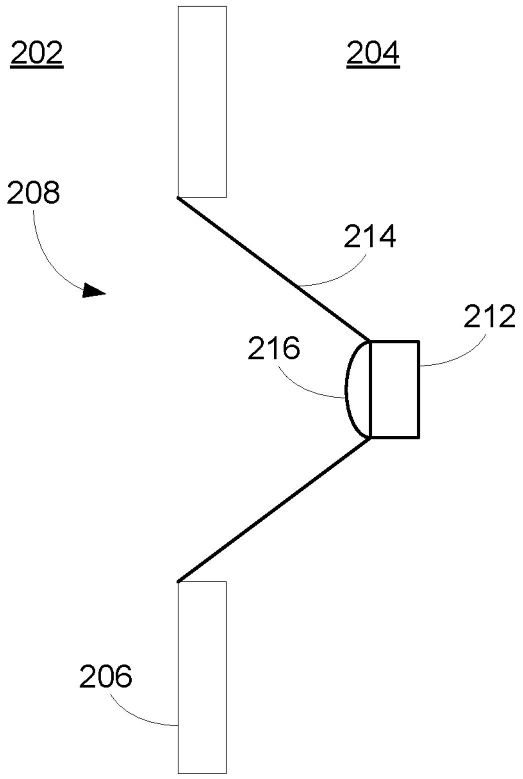
FIG. 2 is a schematic diagram illustrating an externally coupled loudspeaker, according to various embodiments.

FIG. 2 is a schematic diagram illustrating an externally coupled loudspeaker, according to various embodiments. ECS 212 includes, without limitation, a diaphragm or membrane 214 and a dust cap 216. ECS 212 can be arranged along a vehicle chassis, frame, or panel 206 between the inside 202 and the outside 204 of a vehicle cabin (e.g., vehicle cabin 104) of a vehicle (e.g., vehicle 100). In some embodiments, ECS 212 is arranged in a baffle along the chassis, frame, or panel. The chassis, frame, panel, or baffle can include an opening 208 in which ECS 212 is arranged. A first side of ECS 212 can be directed to the inside 202 of the vehicle cabin (or other region where audio output is desired) and a second side of ECS 212 can be directed to the outside 204 (or to another region opposite of the region where audio output is desired), so that an acoustical signal is radiated to the inside 202 of the vehicle cabin. In some embodiments, the side of ECS 212 facing the region where audio output is desired (e.g., inside 202) can be said to the front side of ECS 212, and the opposite side can be said to the back side of ECS 212. Diaphragm 214 of ECS 212 can be positioned at the front side of ECS 212 facing inside 202 as shown in FIG. 2, or at the second side of ECS 212 facing outside 204. Diaphragm 214 can have any suitable shape and/or geometry. In some embodiments, diaphragm 214 is substantially cone-shaped.

In some embodiments, from a front view of diaphragm 214, the center of diaphragm 214 includes an opening to the interior of ECS 212 housing various components (e.g., the voice coil) of ECS 212. Accordingly, ECS 212 can include a dust cap 216 to reduce the amount of dust and debris entering into the interior (e.g., the voice coil gap) of ECS 212. In some embodiments, dust cap 216 can affect an audio response (e.g., a high frequency response) of ECS 212. Dust cap 216 can have any suitable shape and/or geometry. In some embodiments, dust cap 216 is substantially dome-shaped.

A drawback that arises due to the coupling of an ECS (e.g., loudspeaker 110, ECS 212) to the outside of a vehicle (e.g., outside environment 102 external to vehicle 100) is that noise from the outside environment (e.g., road noise) which would usually be blocked by the otherwise sealed interior of the vehicle (e.g., vehicle cabin 104) may enter into the cabin of the vehicle, which leads to higher amount of exterior noise entering into the vehicle cabin. A response to this drawback is to place a sound attenuating material (e.g., a noise-vibration-harshness (NVH) material) in front of the face of the ECS that is facing vehicle cabin 104 (e.g., the side of an ECS facing the inside of the vehicle). However, this response has a drawback of significantly reducing the acoustic output of the ECS. This reduced acoustic output can negatively affect the sound produced by ECS and be unsatisfactory to users of the ECS.

In response to these drawbacks, an externally coupled loudspeaker can have a diaphragm and/or a dust cap that includes a sound-attenuating material. The sound-attenuating material attenuates sounds from the outside environment (e.g., outside environment 102), including for example road noise from an environment outside a vehicle. Because the sound-attenuating material is located at the diaphragm and/or dust cap, the sound-attenuating material has a small impact on the acoustic output produced by the loudspeaker vibrating the diaphragm to create sound waves. Example constructions of an ECS are described below.

Figure 3:
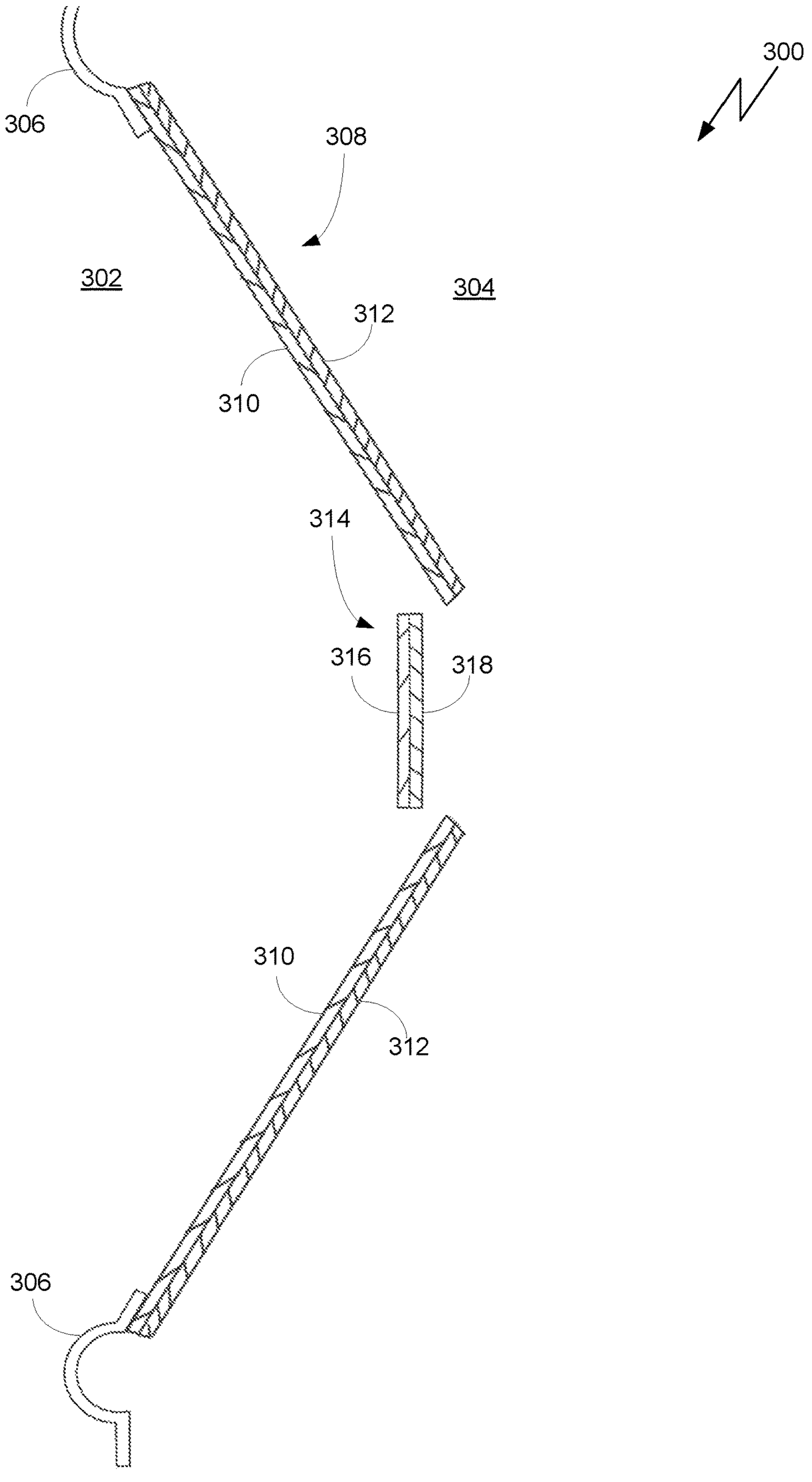
FIG. 3 illustrates a cross-sectional diagram of a first example externally coupled loudspeaker, according to various embodiments.

FIG. 3 illustrates a cross-sectional diagram of a first example ECS 300, according to various embodiments. ECS 300 includes, without limitation, a diaphragm 308 and a dust cap 314. Dust cap 314 is placed over a center of diaphragm 308. Diaphragm 308 can be mounted or coupled to a frame 306 (e.g., a baffle, a vehicle chassis). ECS 300 is arranged between inside 302 and outside 304 of a vehicle cabin or other region where audio output is desired. As shown, the front of ECS 300 faces toward inside 302, and sound waves produced by ECS 300 radiates toward inside 302.

As shown, diaphragm 308 includes, without limitation, a first, acoustic-structural layer 310 and a second, sound-attenuating layer 312. Acoustic-structural layer 310 is located on the side of diaphragm 308 that faces inside 302, and sound-attenuating layer 312 is on the side of diaphragm 308 that faces outside 304.

In some embodiments, acoustic-structural layer 310 can be configured (e.g., acoustically designed) to radiate sound waves to inside 302 when ECS 300 is in operation, and also to provide structure and shape to diaphragm 308. More generally, acoustic-structural layer 310 can be configured to provide functionality typically associated with a loudspeaker (e.g., providing structure to diaphragm 308, radiating sound waves and/or providing other acoustic functionality). In some embodiments, acoustic-structural layer 310 is configured to meet certain acoustic output performance requirements for ECS 300 (e.g., performance requirements defined by an original equipment manufacturer, system implementer, an end customer, and/or the like). Acoustic-structural layer 310 can be implemented with one or more materials (e known materials or materials specifically engineered for the implementation), shape, and/or geometry in order to meet performance requirements. For example, for a given implementation, ECS 300 could have acoustic output performance requirements (e.g., a minimum and/or maximum sound pressure level (SPL), a mean SPL, a range of SPLs, a minimum and/or maximum frequency, a range of frequencies) associated with the given implementation, and certain materials and/or shape for layer 310 would be selected to meet those acoustic output performance requirements. In some embodiments, acoustic-structural layer 310 can be made of any suitable material and can be of any suitable thickness. In some embodiments, the material used for acoustic-structural layer 310 is a structural material with acoustic properties that meet the acoustic output performance requirements. In some embodiments, at least a portion of acoustic-structural layer 310 can be treated with one or more processes to give acoustic-structural layer 310 protection against the elements and to the environment (e.g., waterproofing, lamination, and/or the like).

Sound-attenuating layer 312 can be configured to attenuate sounds passing from one side of ECS 300 to the other side of ECS 300 (e.g., sounds passing from outside 304 to inside 302 and/or sounds passing from inside 302 to outside 304). Sound-attenuating layer 312 can be made of a material that reduces the noise, vibration, and harshness of sounds passing from either side of ECS 300 to the other side. In some embodiments, sound-attenuating layer 312 can be made of an NVH material, aerogel, a foam material, a fibrous material, and/or the like. In some embodiments, the material is selected and/or engineered to meet specified sound attenuation requirements (e.g., minimum amount of reduction and/or minimum amount of absorption for sounds passing through). In some embodiments, at least a portion of sound-attenuating layer 312 can be treated with one or more processes to give sound-attenuating layer 312 protection against the elements and to the environment (e.g., waterproofing, lamination, and/or the like).

In some embodiments, acoustic-structural layer 310 is adhered to sound-attenuating layer 312 (e.g., via a glue or other adhesive, via a chemical or physical treatment of either or both layers that causes acoustic-structural layer 310 to bond with or otherwise adhere to sound attenuating layer 312 and/or vice versa).

Similar to diaphragm 308, dust cap 314 can also include an acoustic-structural layer 316 and a sound-attenuating layer 318. Acoustic-structural layer 316 of dust cap 314 can be implemented with similar materials as acoustic-structural layer 310 of diaphragm 308, and sound-attenuating layer 318 of dust cap 314 can be implemented with similar materials as sound-attenuating layer 312 of diaphragm 308. That is, acoustic-structural layer 316 can be configured to provide structural and acoustic functionality to dust cap 314, and sound-attenuating layer 312 can be configured to attenuate sounds passing from a side of ECS 300 to the other side of dust cap 314 (e.g., outside 304 to inside 302 and/or vice versa). In some embodiments, at least a portion of either or both of layers 316 and 318 can be treated with one or more processes to give the layer(s) protection against the elements and to the environment (e.g., waterproofing, lamination, and/or the like).

In some embodiments, sound-attenuating layer 312 of diaphragm 308 can cover less than the full surface area of diaphragm 308 that is exposed to an environment. For example, sound-attenuating layer 312 can cover just a portion of the surface of diaphragm 308 facing outside 304. Similarly, sound-attenuating layer 318 of dust cap 314 can cover less than the full surface area of dust cap 314 that is exposed to an environment (e.g., facing outside 304). Further, while FIG. 3 shows both diaphragm 308 and dust cap 314 having respective sound-attenuating layers, in some embodiments, either or both of diaphragm 308 and dust cap 314 can have a sound-attenuating layer. For example, in ECS 300 as shown in FIG. 3, each of diaphragm 308 and dust cap 314 could have an acoustic-structural layer and a sound-attenuating layer. As another example, diaphragm 308 could have acoustic-structural and sound-attenuating layers as shown in FIG. 3, and dust cap 314 could include acoustic-structural layer 316 and omit sound-attenuating layer 318 (e.g., dust cap 314 could be a conventional dust cap). As yet another example, diaphragm 308 could have a sound-attenuating layer 312 that partially covers the surface of diaphragm 308, and as shown in FIG. 3, and dust cap 314 could include acoustic-structural layer 316 and omit sound-attenuating layer 318 (e.g., dust cap 314 could be a conventional dust cap).

In some embodiments, sound-attenuating layer 312 provides structure to diaphragm 308 and/or sound-attenuating layer 318 provides structure to dust cap 314, in addition or alternatively to acoustic-structural layer 310 and 316, respectively. That is, for diaphragm 308, sound-attenuating layer 312 can be configured to provide structure (e.g., rigidity, flexibility, shape) to diaphragm 308, as well as or instead of acoustic-structural layer 310. Similarly, for dust cap 314, sound-attenuating layer 318 can be configured to provide structure (e.g., rigidity, flexibility, shape) to dust cap 314, as well as or instead of acoustic-structural layer 316. Further, in some embodiments, diaphragm 308 and dust cap 314 can be made with different materials. For example, the layers in diaphragm 308 can be made of different materials than the respective similar layers in dust cap 314. Additionally, in some embodiments, different layers in diaphragm 308 and/or dust cap 314 can have different thicknesses. For example, sound-attenuating layer 312 could have a different thickness than acoustic-structural layer 310. Similarly, sound-attenuating layer 312 of diaphragm 308 could have a different thickness than sound-attenuating layer 318 of dust cap 314.

Figure 4:
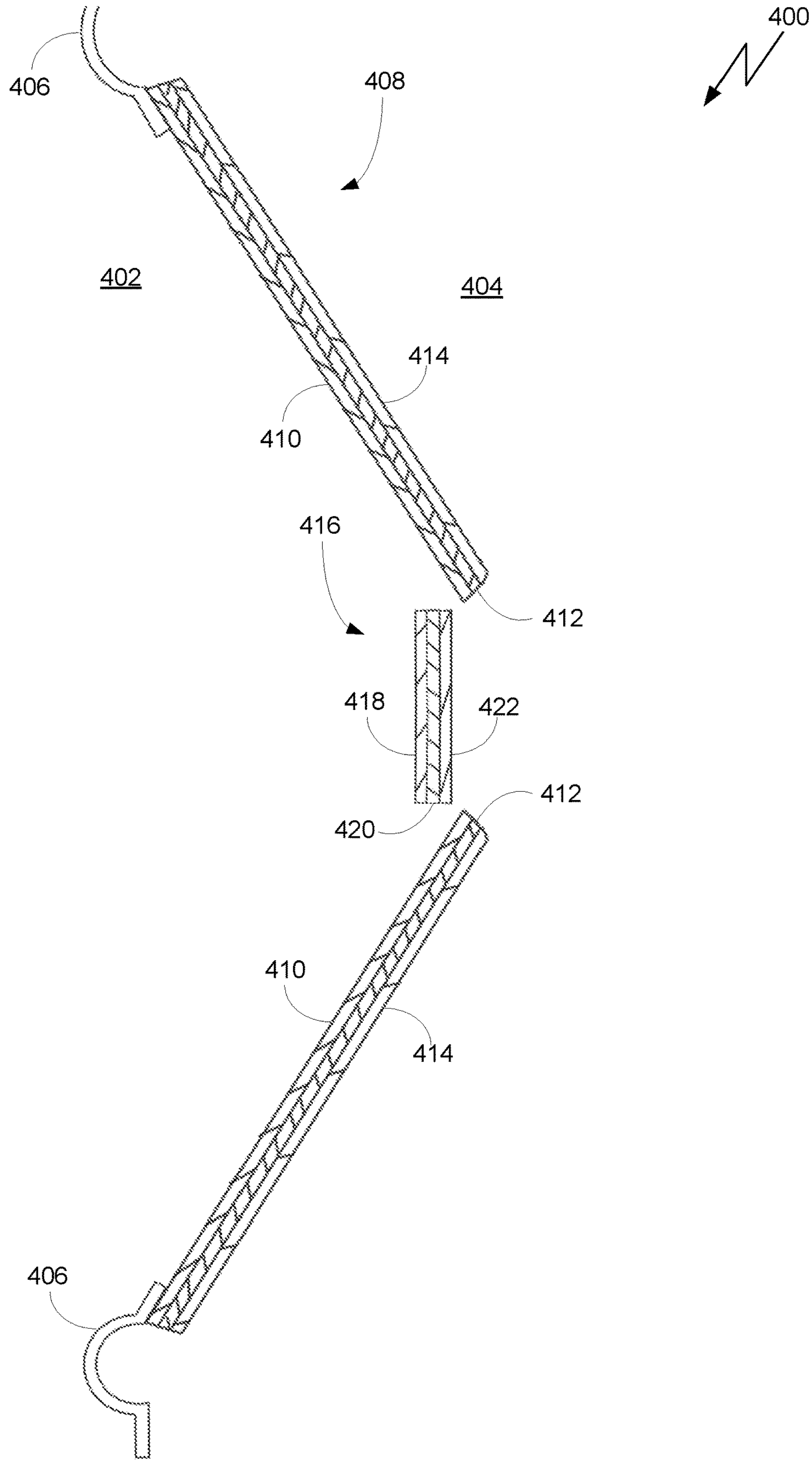
FIG. 4 illustrates a cross-sectional diagram of a second example externally coupled loudspeaker, according to various embodiments.

FIG. 4 illustrates a cross-sectional diagram of a second ECS 400, according to various embodiments. ECS 400 includes, without limitation, a diaphragm 408 and a dust cap 416. Dust cap 416 is placed over a center of diaphragm 408. Diaphragm 408 can be mounted or coupled to a frame 406 (e.g., a baffle, a vehicle chassis). ECS 400 is arranged between inside 402 and outside 404 of a vehicle cabin or other region where audio output is desired. As shown, the front of ECS 400 faces toward inside 402, and sound waves produced by ECS 400 radiates toward inside 402.

As shown, diaphragm 408 is constructed with a first, acoustic-structural layer 410, a second, sound-attenuating layer 412, and a third, structural-environmental layer 414. Acoustic-structural layer 410 is located on the side of diaphragm 408 that faces inside 402, and structural-environmental layer 414 is on the side of diaphragm 408 that faces outside 404. Sound-attenuating layer 412 is positioned between acoustic-structural layer 410 and structural-environmental layer 414.

In some embodiments, acoustic-structural layer 410 can be configured (e.g., acoustically designed) to radiate sound waves to inside 402 when ECS 400 is in operation, and also to provide structure and shape to diaphragm 408. More generally, acoustic-structural layer 410 can be configured to provide functionality typically associated with a loudspeaker (e.g., providing structure to diaphragm 408, radiating sound waves and providing other acoustic functionality). In some embodiments, acoustic-structural layer 410 is configured to meet certain acoustic output performance requirements for ECS 400 (e.g., performance requirements defined by an original equipment manufacturer, system implementer, an end customer, and/or the like). Acoustic-structural layer 410 can be implemented with one or more materials (e known materials or materials specifically engineered for the implementation), shape, and/or geometry in order to meet performance requirements. For example, for a given implementation, ECS 400 could have acoustic output performance requirements (e.g., a minimum and/or maximum sound pressure level (SPL), a mean SPL, a range of SPLs, a minimum and/or maximum frequency, a range of frequencies) associated with the given implementation, and certain materials and/or shape for layer 410 would be selected to meet those acoustic output performance requirements. In some embodiments, acoustic-structural layer 410 can be made of any suitable material and can be of any suitable thickness. In some embodiments, the material used for acoustic-structural layer 410 is a structural material with acoustic properties that meet the acoustic output performance requirements. In some embodiments, the material used for acoustic-structural layer 410 is a material with structural properties and acoustic properties that meet the acoustic output performance requirements. In some embodiments, at least a portion of acoustic-structural layer 410 can be treated with one or more processes to give acoustic-structural layer 410 protection against the elements and to the environment (e.g., waterproofing, lamination, and/or the like).

Sound-attenuating layer 412 can be configured to attenuate sounds passing from one side of ECS 400 to the other side of ECS 400 (e.g., sounds passing from outside 404 to inside 402 and/or sounds passing from inside 402 to outside 404). Sound-attenuating layer 412 can be made of a material that reduces the noise, vibration, and harshness of sounds passing from either side of ECS 400 to the other side. In some embodiments, sound-attenuating layer 412 can be made of an NVH material, aerogel, a foam material, a fibrous material, and/or the like. In some embodiments, the material is selected and/or engineered to meet specified sound attenuation requirements.

In some embodiments, structural-environmental layer 414 can be configured to provide structure and/or environmental protection (e.g., protection from the elements and the environment) to diaphragm 408. More generally, structural-environmental layer 414 can be configured to provide structural and/or protective functionality to diaphragm 408 (e.g., providing structure to diaphragm 408, protecting diaphragm 408 from water and heat). Structural-environmental layer 414 can be configured so via selection of certain materials for the layer, engineering the material(s) and/or the shape of the layer, and/or the like. In some embodiments, structural-environmental layer 414 can be made of any suitable material. In some embodiments, the material used for structural-environmental layer 414 is a structural material and/or a protective material. In some embodiments, at least a portion of structural-environmental layer 414 can be treated with one or more processes to give structural-environmental layer 414 protection against the elements and to the environment (e.g., waterproofing, lamination, and/or the like).

In some embodiments, sound-attenuating layer 412 is adhered to acoustic-structural layer 410 on one side of sound-attenuating layer 412 (e.g., via a glue or other adhesive, via a chemical or physical treatment of the layers that causes sound-attenuating layer 412 to bond with or otherwise adhere to acoustic-structural layer 410 and/or vice versa). Sound-attenuating layer 412 can adhere to structural-environmental layer 414 on the side of sound-attenuating layer 412 opposite acoustic-structural layer 410 (e.g., via a glue or other adhesive, via a chemical or physical treatment of the layers that causes sound-attenuating layer 412 to bond with or otherwise adhere to structural-environmental layer 414 and/or vice versa).

Similar to diaphragm 408, dust cap 416 can also include an acoustic-structural layer 418, a sound-attenuating layer 420, and a structural-environmental layer 422. Acoustic-structural layer 418 of dust cap 416 can be implemented with similar materials as acoustic-structural layer 410 of diaphragm 408. Sound-attenuating layer 420 of dust cap 416 can be implemented with similar materials as sound-attenuating layer 412 of diaphragm 408. Structural-environmental layer 422 of dust cap 416 can be implemented with similar materials as structural-environmental layer 414 of diaphragm 408. That is, acoustic-structural layer 418 can be configured to provide structural and acoustic functionality to dust cap 416, sound-attenuating layer 420 can be configured to attenuate sounds passing from a side of ECS 400 to the other side of dust cap 416 (e.g., outside 404 to inside 402 and/or vice versa), and structural-environmental layer 422 can be configured to provide structure and/or environmental protection to dust cap 416. In some embodiments, at least a portion of either or both of layers 418 and 422 can be treated with one or more processes to give the layer(s) protection against the elements and to the environment (e.g., waterproofing, lamination, and/or the like).

While diaphragm 408 is shown to have one sound-attenuating layer 412 between acoustic-structural layer 410 and structural-environmental layer 414, in some embodiments, diaphragm 408 can have multiple sound-attenuating layers between acoustic-structural layer 410 and structural-environmental layer 414. The multiple sound-attenuating layers can be made of different sound-attenuating materials (e.g., one layer made of aerogel and another layer made of a foam) and/or can have different thicknesses. For example, in one example, a first sound-attenuating layer made of a first sound-attenuating material and a second sound-attenuating layer made of a second sound-attenuating material can be sandwiched between acoustic-structural layer 410 and structural-environmental layer 414. Similarly, dust cap 416 can have multiple sound-attenuating layers between acoustic-structural layer 418 and structural-environmental layer 422.

In some embodiments, sound-attenuating layer 412 of diaphragm 408 can cover less than the full surface area between acoustic-structural layer 410 and structural-environmental layer 414. For example, sound-attenuating layer 412 can cover just a portion of the area between acoustic-structural layer 410 and structural-environmental layer 414. Similarly, sound-attenuating layer 420 of dust cap 416 can cover less than the full surface area between acoustic-structural layer 418 and structural-environmental layer 422. Further, while FIG. 4 shows both diaphragm 408 and dust cap 416 having respective sound-attenuating layers, in some embodiments, either or both of diaphragm 408 and dust cap 416 can have a sound-attenuating layer. For example, in ECS 400 as shown in FIG. 4, each of diaphragm 408 and dust cap 416 could have a sound-attenuating layer sandwiched between an acoustic-structural layer and a structural-environmental layer. As another example, diaphragm 408 could have a sound-attenuating layer as shown in FIG. 4, and dust cap 416 could omit sound-attenuating layer 420 (e.g., dust cap 416 could be a conventional dust cap). As yet another example, diaphragm 408 could have a sound-attenuating layer 412 that occupies just part of the space between acoustic-structural layer 410 and structural-environmental layer 414, and dust cap 416 could omit sound-attenuating layer 420 (e.g., dust cap 416 could be a conventional dust cap).

In some embodiments, diaphragm 408 and dust cap 416 can be made with different materials. For example, the layers in diaphragm 408 can be made of different materials than the respective similar layers in dust cap 416. Additionally, in some embodiments, different layers in diaphragm 408 and/or dust cap 416 can have different thicknesses. For example, sound-attenuating layer 412 could have a different thickness than acoustic-structural layer 410 and/or structural-environmental layer 414. Similarly, sound-attenuating layer 412 of diaphragm 408 could have a different thickness than sound-attenuating layer 420 of dust cap 416.

Figure 5A:
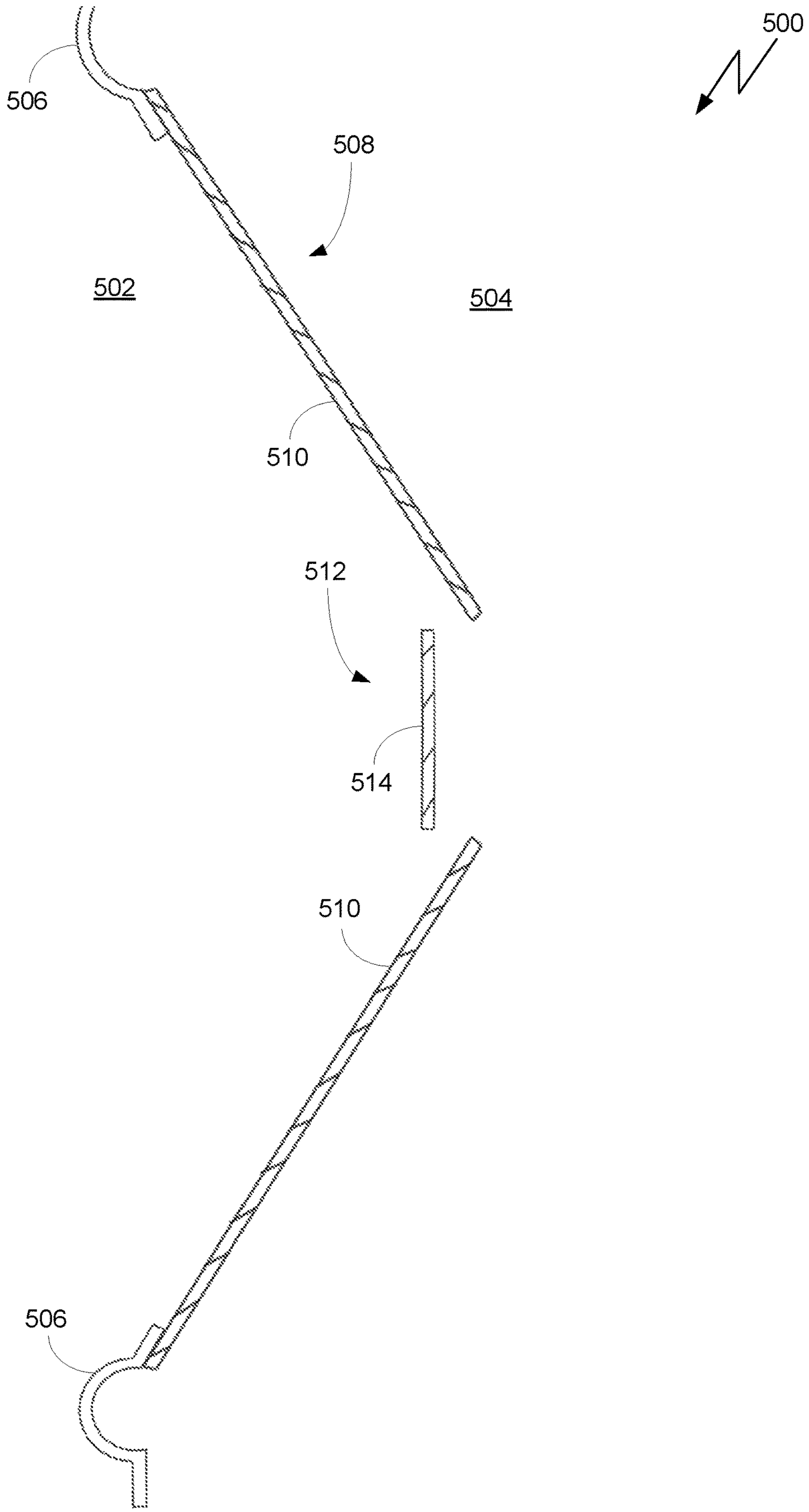
FIG. 5A illustrates a cross-sectional diagram of a third example externally coupled loudspeaker, according to various embodiments.

FIG. 5A illustrates a cross-sectional diagram of a third example ECS 500, according to various embodiments. ECS 500 includes, without limitation, a diaphragm 508 and a dust cap 512. Dust cap 512 is placed over a center of diaphragm 508. Diaphragm 508 can be mounted or coupled to a frame 506 (e.g., a baffle, a vehicle chassis). ECS 500 is arranged between inside 502 and outside 504 of a vehicle cabin or other region where audio output is desired. As shown, the front of ECS 500 faces toward inside 502, and sound waves produced by ECS 500 radiates toward inside 502.

As shown, diaphragm 508 is constructed with a single layer 510. Layer 510 can be made of a composite material or a mix of materials. In some embodiments, layer 510 can be configured to radiate sound waves to inside 502 when ECS 500 is in operation; to provide structure, shape, and protection to diaphragm 508; and to attenuate sounds passing from one side of ECS 500 to the other side of ECS 500 (e.g., sounds passing from outside 504 to inside 502 and/or sounds passing from inside 502 to outside 504). More generally, layer 510 can be configured to provide functionality typically associated with a loudspeaker (e.g., providing structure to diaphragm 408, radiating sound waves and providing other acoustic functionality) and to attenuate sounds passing from one side of ECS 500 to the other side. In some embodiments, layer 510 is configured to meet certain acoustic output performance requirements for ECS 500 (e.g., performance requirements defined by an original equipment manufacturer, system implementer, an end customer, and/or the like). Layer 510 can be implemented with one or more materials (e.g., known materials or materials specifically engineered for the implementation) for the composite/mix, shape, and/or geometry in order to meet performance requirements. For example, for a given implementation, ECS 500 could have acoustic output performance requirements (e.g., a minimum and/or maximum sound pressure level (SPL), a mean SPL, a range of SPLs, a minimum and/or maximum frequency, a range of frequencies) associated with the given implementation, and certain materials (for the composite or mix) and/or shape for layer 510 would be selected to meet those acoustic output performance requirements. Further, the materials and/or shape would be selected for having certain structural properties and having sound attenuation properties meeting specified sound attenuation requirements. In some embodiments, layer 510 can have any suitable thickness and include any suitable composite material or mix of materials. In some embodiments, at least a portion of layer 510 can be treated with one or more processes to give layer 510 protection against the elements and to the environment (e.g., waterproofing, lamination, and/or the like). Examples of composite materials or mixes of materials for layer 510 are further described below with reference to FIG. 5B.

Similar to diaphragm 508, dust cap 512 can also include a single layer 514. Layer 514 of dust cap 512 can be constructed and configured similarly as layer 510 of diaphragm 508. That is, layer 514 can be configured to provide acoustic, structural, protective, and sound-attenuation functionality to dust cap 512. In some embodiments, at least a portion of layer 514 can also be treated with one or more processes to give layer 514 protection against the elements and to the environment (e.g., waterproofing, lamination, and/or the like).

While FIG. 5A shows each of diaphragm 508 and dust cap 512 each having a single layer made of a sound-attenuating composite material or mix of materials, in some embodiments, either or both of diaphragm 508 and dust cap 512 can have a single layer with a sound-attenuating composite material or mix of materials. For example, in ECS 500 as shown in FIG. 5A, each of diaphragm 508 and dust cap 512 could have a single layer made of a sound-attenuating composite material or mix of materials. As another example, diaphragm 508 could have single layer made of a sound-attenuating composite material or mix of materials as shown in FIG. 5A, and layer 514 of dust cap 512 could be made of a material that omits sound attenuation properties (e.g., dust cap 512 could be a conventional dust cap).

In some embodiments, diaphragm 508 and dust cap 512 can be made with different composite materials or different mixes of materials. For example, layer 510 of diaphragm 508 can be made of a different composite material than layer 514 of dust cap 512.

Figure 5B:
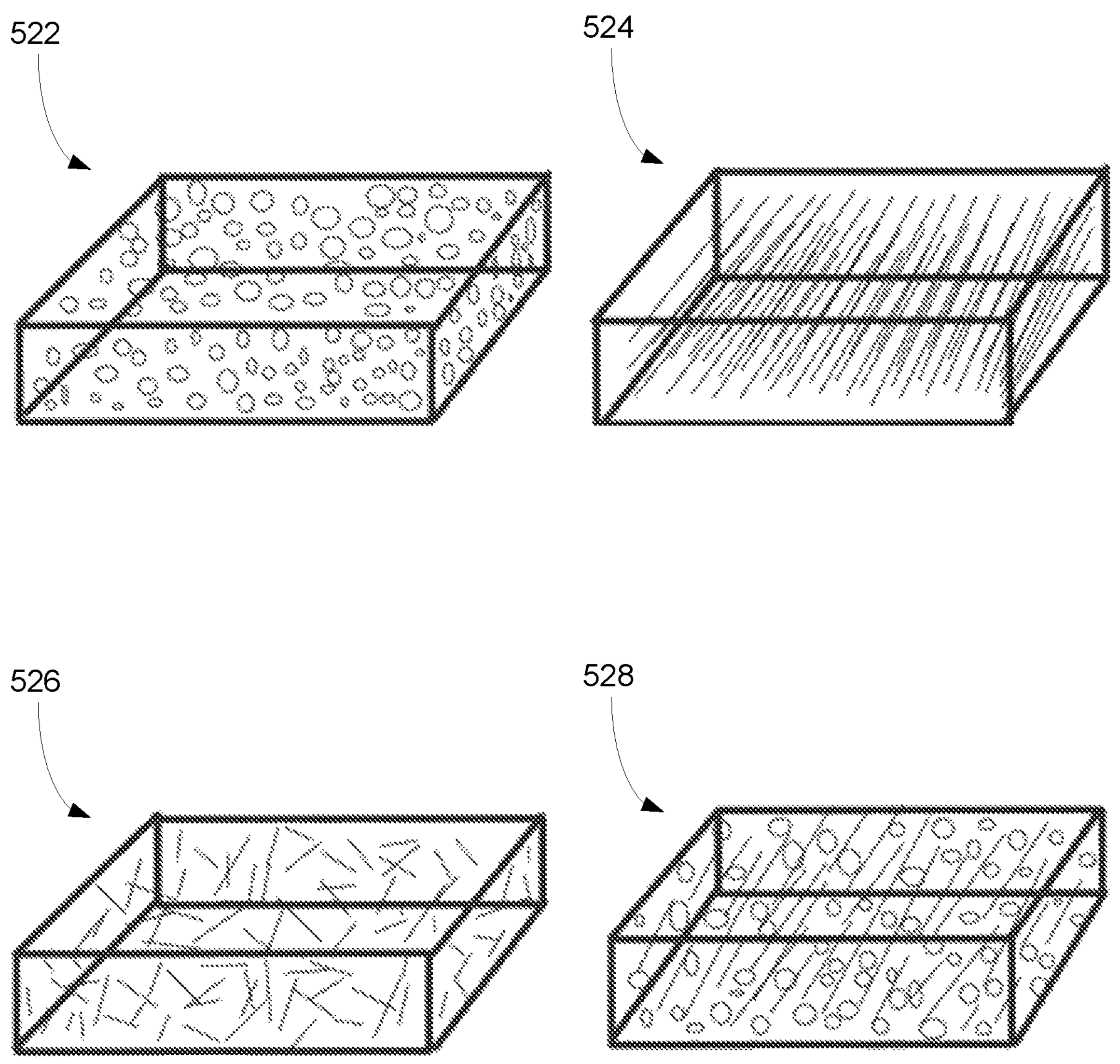
FIG. 5B illustrates examples of composite materials that can be used in the externally coupled loudspeaker of FIG. 5A, according to various embodiments.

FIG. 5B illustrates examples of composite materials that can be used in externally coupled loudspeaker 500, according to various embodiments. As described above, layer 510 of diaphragm 508 and/or layer 514 of dust cap 512 can be made of a composite material. One example composite material is a filled composite 522 (e.g., a foam-like composite). A second example is a long-fiber composite 524. A third example is a short fiber composite 526. A fourth example is a hybrid filled and fiber (long or short) composite 528. In some embodiments, the combination of materials in the composite maximizes the sound attenuation capability and structural properties (e.g., strength, stiffness) compared to any of the constituent material in the composite alone.

In some embodiments, layer 510 of diaphragm 508 and/or layer 514 of dust cap 512 can be made of an engineered material to have acoustic, structural, environmental, and sound attenuation properties similar to those described above.

The constructions of diaphragms and dust caps described above in conjunction with ECS 300, 400, and 500 are examples of possible approaches to implementing and/or configuring an ECS to include sound attenuation properties for attenuating sounds passing through the ECS. In some embodiments, an ECS can include any suitable and technically feasible combination of these approaches. For example, an ECS could include a multi-layer diaphragm similar to diaphragm 308 or 408, and a single-layer dust cap similar to dust cap 512. As another example, an ECS could include a single-layer diaphragm similar to diaphragm 508, and a conventional dust cap. As a further example, an ECS could include a multi-layer diaphragm similar to diaphragm 308 or 408, and the sound-attenuation layer(s) in the multi-layer diaphragm could be made of a composite material with sound-attenuation capability (e.g., any of the composite materials discussed above in conjunction with FIGS. 5A-5B).

While the approaches described above are described in the context of an externally coupled loudspeaker implemented in a vehicle, it should be appreciated that the above-described approaches can be implemented in any loudspeaker where attenuation of sounds passing through the speaker from one side of the speaker to the other side of the speaker (e.g., from the back side to the front side) is desired. For example, a speaker implemented similarly as those described above could be implemented in a vehicle to attenuate noise from the engine compartment of the vehicle passing through the speaker into the vehicle cabin. As another example, a speaker implemented similarly as those described above could be implemented in a room to attenuate noise from outside the room passing through the speaker into the room.

In sum, an externally coupled loudspeaker can include a diaphragm that includes a sound-attenuating construction. The diaphragm can include a sound-attenuating material in a layered or a composite construction. The sound-attenuating material can span at least some of the area of the diaphragm. The externally coupled loudspeaker can also include a dust cap with a similar sound-attenuating construction.

At least one technical advantage of the disclosed techniques relative to the prior art is that, with the disclosed techniques, undesirable noise passing through an externally coupled loudspeaker from an outside environment can be attenuated with less impact on the acoustic output of the loudspeaker. Accordingly, the loudspeaker can produce higher-output audio while the undesirable noise is mitigated, compared to conventional approaches. Another technical advantage is that the passing noise can be attenuated by the loudspeaker without adding an additional piece of material in front of the loudspeaker. Accordingly, the loudspeaker takes up less space. These technical advantages provide one or more technological improvements over prior art approaches.

1. In some embodiments, a loudspeaker apparatus comprises a diaphragm comprising an acoustic layer configured to emit output sounds toward a first side of the loudspeaker apparatus; and a first sound attenuation layer configured to attenuate sounds passing from a second side of the loudspeaker apparatus to the first side through the diaphragm, wherein the first sound attenuation layer is positioned nearer to the second side relative to the acoustic layer.

2. The loudspeaker apparatus of clause 1, wherein the first sound attenuation layer adheres to the acoustic layer.

3. The loudspeaker apparatus of clauses 1 or 2, wherein the first sound attenuation layer comprises a composite material.

4. The loudspeaker apparatus of any of clauses 1-3, wherein the first sound attenuation layer comprises a mixture of materials.

5. The loudspeaker apparatus of any of clauses 1-4, wherein the second side comprises an external environment.

6. The loudspeaker apparatus of any of clauses 1-5, wherein the diaphragm further comprises a structural layer, wherein the first sound attenuation layer is positioned between the acoustic layer and the structural layer.

7. The loudspeaker apparatus of any of clauses 1-6, wherein the first sound attenuation layer adheres to the acoustic layer on a first side of the first sound attenuation layer and adheres to the structural layer on a second side of the first sound attenuation layer opposite the first side of the first sound attenuation layer.

8. The loudspeaker apparatus of any of clauses 1-7, wherein the diaphragm further comprises a second sound attenuation layer positioned between the acoustic layer and the structural layer.

9. The loudspeaker apparatus of any of clauses 1-8, wherein the second sound attenuation layer comprises a different material than the first sound attenuation layer.

10. The loudspeaker apparatus of any of clauses 1-9, further comprising a dust cap, wherein the dust cap comprises a second acoustic layer configured to emit output sounds toward a first side of the loudspeaker apparatus; and a second sound attenuation layer configured to attenuate sounds passing from a second side of the loudspeaker apparatus to the first side through the dust cap, wherein the second sound attenuation layer is positioned nearer to the second side relative to the second acoustic layer.

11. The loudspeaker apparatus of any of clauses 1-10, wherein the dust cap further comprises a structural layer.

12. In some embodiments, an audio system comprises a loudspeaker comprising a diaphragm, and a dust cap; wherein the diaphragm comprises an acoustic layer configured to emit output sounds toward a first side of the loudspeaker; and a first sound attenuation layer configured to attenuate sounds passing from a second side of the loudspeaker to the first side, wherein the first sound attenuation layer is positioned nearer to the second side relative to the acoustic layer.

13. The audio system of clause 12, wherein the second side comprises an external environment.

14. The audio system of clauses 12 or 13, wherein the diaphragm further comprises a structural layer, wherein the first sound attenuation layer is positioned between the acoustic layer and the structural layer.

15. The audio system of any of clauses 12-14, wherein the first sound attenuation layer adheres to the acoustic layer.

16. The audio system of any of clauses 12-15, wherein the dust cap comprises a second acoustic layer configured to emit output sounds toward a first side of the loudspeaker; and a second sound attenuation layer configured to attenuate sounds passing from a second side of the loudspeaker to the first side through the dust cap, wherein the second sound attenuation layer is positioned nearer to the second side relative to the second acoustic layer.

17. The audio system of any of clauses 12-16, wherein the audio system is implemented in a vehicle, wherein the first side comprises a passenger cabin of the vehicle, and wherein the second side comprises an environment external to the vehicle.

18. In some embodiments, a loudspeaker apparatus comprises a diaphragm, comprising a single layer of material, wherein the single layer is configured to emit output sounds toward a first side of the loudspeaker apparatus, provide structure to the diaphragm, and attenuate sounds passing from a second side of the loudspeaker apparatus to the first side.

19. The loudspeaker apparatus of clause 18, wherein the single layer comprises a sound-attenuating composite material.

20. The loudspeaker apparatus of clauses 18 or 19, wherein the composite material comprises at least one of a filled material, a long fiber material, or a short fiber material.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

While the preceding is directed to embodiments of the present disclosure, other and further embodiments of the disclosure may be devised without departing from the basic scope thereof, and the scope thereof is determined by the claims that follow.

What is claimed is:

1. A loudspeaker apparatus, comprising:
a diaphragm, comprising:
an acoustic layer configured to emit output sounds toward a first side of the loudspeaker apparatus, wherein the first side is exposed to a vehicle cabin; and
a first sound attenuation layer configured to attenuate sounds passing from a second side of the loudspeaker apparatus to the first side through the diaphragm, wherein the first sound attenuation layer is positioned nearer to the second side relative to the acoustic layer, wherein the second side is exposed to an environment external to the vehicle cabin.

2. The loudspeaker apparatus of claim 1, wherein the first sound attenuation layer adheres to the acoustic layer.

3. The loudspeaker apparatus of claim 1, wherein the first sound attenuation layer comprises a composite material.

4. The loudspeaker apparatus of claim 1, wherein the first sound attenuation layer comprises a mixture of materials.

5. The loudspeaker apparatus of claim 1, wherein the second side comprises an external environment.

6. The loudspeaker apparatus of claim 1, wherein the diaphragm further comprises a structural layer, wherein the first sound attenuation layer is positioned between the acoustic layer and the structural layer.

7. The loudspeaker apparatus of claim 6, wherein the first sound attenuation layer adheres to the acoustic layer on a first side of the first sound attenuation layer and adheres to the structural layer on a second side of the first sound attenuation layer opposite the first side of the first sound attenuation layer.

8. The loudspeaker apparatus of claim 6, wherein the diaphragm further comprises a second sound attenuation layer positioned between the acoustic layer and the structural layer.

9. The loudspeaker apparatus of claim 8, wherein the second sound attenuation layer comprises a different material than the first sound attenuation layer.

10. The loudspeaker apparatus of claim 1, further comprising a dust cap, wherein the dust cap comprises:
a second acoustic layer configured to emit output sounds toward a first side of the loudspeaker apparatus; and
a second sound attenuation layer configured to attenuate sounds passing from a second side of the loudspeaker apparatus to the first side through the dust cap, wherein the second sound attenuation layer is positioned nearer to the second side relative to the second acoustic layer.

11. The loudspeaker apparatus of claim 10, wherein the dust cap further comprises a structural layer.

12. An audio system, comprising:
a loudspeaker comprising:
a diaphragm, and
a dust cap;
wherein the diaphragm comprises:
an acoustic layer configured to emit output sounds toward a first side of the loudspeaker; and
a first sound attenuation layer configured to attenuate sounds passing from a second side of the loudspeaker to the first side, wherein the first sound attenuation layer is positioned nearer to the second side relative to the acoustic layer,
wherein the dust cap comprises:
a second acoustic layer configured to emit output sounds toward a first side of the loudspeaker; and
a second sound attenuation layer configured to attenuate sounds passing from a second side of the loudspeaker to the first side through the dust cap, wherein the second sound attenuation layer is positioned nearer to the second side relative to the second acoustic layer.

13. The audio system of claim 12, wherein the second side comprises an external environment.

14. The audio system of claim 12, wherein the diaphragm further comprises a structural layer, wherein the first sound attenuation layer is positioned between the acoustic layer and the structural layer.

15. The audio system of claim 12, wherein the first sound attenuation layer adheres to the acoustic layer.

16. The audio system of claim 12, wherein the second acoustic layer has a first thickness and the second sound attenuation layer has a second thickness that is different from the first thickness.

17. The audio system of claim 12, wherein the audio system is implemented in a vehicle, wherein the first side comprises a passenger cabin of the vehicle, and wherein the second side comprises an environment external to the vehicle.

18. A loudspeaker apparatus, comprising:
a diaphragm, comprising a single layer of material, wherein the single layer is configured to:
emit output sounds toward a first side of the loudspeaker apparatus,
provide structure to the diaphragm, and
attenuate sounds passing from a second side of the loudspeaker apparatus to the first side,
wherein the first side is exposed to a vehicle cabin and the second side vents to an outside environment.

19. The loudspeaker apparatus of claim 18, wherein the single layer comprises a sound-attenuating composite material.

20. The loudspeaker apparatus of claim 19, wherein the composite material comprises at least one of a filled material, a long fiber material, or a short fiber material.

* * * * *